United States Patent [19]

Sims

[11] 4,385,090
[45] May 24, 1983

[54] MANUFACTURE OF COVERED FOAM PRODUCTS

[76] Inventor: Geoffrey Sims, 61 Swinton Rise, Rauenshead/Nottinghamshire, England

[21] Appl. No.: 184,398

[22] Filed: Sep. 5, 1980

[30] Foreign Application Priority Data

Sep. 5, 1979 [GB] United Kingdom ............... 7930801

[51] Int. Cl.³ .............................................. B32B 3/04
[52] U.S. Cl. .................................... 428/121; 156/211;
156/216; 264/321; 428/124; 428/159;
428/314.4; 428/316.6; 428/317.5; 428/319.7
[58] Field of Search ...................... 428/41, 68, 71, 76,
428/81, 121, 122, 124, 126, 127, 128, 129, 157,
158, 159, 160, 314.4, 314.8, 316.6, 317.1, 317.5,
317.7, 318.4, 319.3, 319.7, 319.9; 156/211, 216;
264/321

[56] References Cited

U.S. PATENT DOCUMENTS

| | | | |
|---|---|---|---|
| 3,146,143 | 8/1964 | Bolesky et al. | 156/216 |
| 3,520,754 | 7/1970 | Scholl et al. | 156/216 |
| 3,794,549 | 2/1974 | Schroteler | 428/319.1 |
| 4,201,609 | 5/1980 | Olsen | 156/216 |
| 4,348,448 | 9/1982 | Cornell | 428/124 |

Primary Examiner—William J. Van Balen
Attorney, Agent, or Firm—Kenyon & Kenyon

[57] ABSTRACT

To manufacture a covered foam product, a covering material is laminated onto one side of a foam block, an overhang including a layer of covering material and thin layer of foam, laminated thereto, produced at at least one edge of the block, and the overhang brought into contact with another side of the block and the thin layer heat bonded to the other side.

9 Claims, 5 Drawing Figures

MANUFACTURE OF COVERED FOAM PRODUCTS

BACKGROUND OF THE INVENTION

This invention relates to a method of manufacturing a covered foam product, such as a cushion or mat, and to a blank from which said product can be produced.

There are many uses for covered foam products, such as exercise mats, seat cushions, kneeling pads, etc. In the past, it has been the typical practice to adhesively bond the cover to the foam or in some cases to sew the cover to hold it in place. Both of these methods have suffered from a lack of durability, i.e., separation of the cover from the foam after a period of time has not been uncommon. Thus, the need for a more durable covered foam product is evident.

SUMMARY OF THE INVENTION

The present invention provides a method of making a more durable covered foam product and a blank from which such a product may be made.

According to one aspect of the present invention, a method of manufacturing a covered foam product comprises laminating a covering material onto a surface of a block of foam material, arranging for the covering material to have a portion which extends beyond an edge of said surface and which has laminated thereon a small thickness of foam material, folding said portion of the covering material over said edge so as to bring the small thickness of foam material into contact with a further surface of the block and heat-bonding the small thickness of foam material to said further surface of the block.

In one particular example of the method, the covering material is laminated directly onto said surface of the block with substantially no overhang with respect to at least one side of the block, a part of the block adjacent to said at least one side then being removed to leave a small thickness of the foam material on a portion of the covering material in the region or regions where said part of the block has been removed. Said part of the block can be removed by routing or by cutting with a band knife or a hot blade: most preferably, however, this is performed using a hot wire.

In an alternative example of the method, a small thickness of foam material is laminated onto the covering material. The whole laminated structure including the covering material and foam is heat-bonded onto the surface of the block so as to extend beyond said edge thereof.

The foamed material can be polyurethane but is preferably crosslinked closed cell polyethylene. However any other suitable foam thermoplastic material whether of open or closed cell can be used. The covering material can be ABS, PVC or a textile material, for example.

Conveniently, said portion of the covering material is of such a size as to be foldable over an edge of said further surface of the block opposed to said first-mentioned edge.

According to a second aspect of the present invention, there is provided a method of manufacturing a covered foam product, comprising producing a blank by laminating a covering material onto a surface of an elongate block of foam material such that respective portions of the covering material overhang the longitudinal edges of said block, cutting the blank transversely into individual lengths, removing parts of said block adjacent to said cuts so as to leave a small thickness of the foam material on the covering material in the regions where said parts of the block have been removed, folding the resultant longitudinal and transverse overhanging portions of the covering material around the edges of the block, and bonding said overhanging portions of the covering material to said edges of the block, at least the transverse overhanging portions being heat bonded to the respective edges of the block.

Advantageously, the blank is produced by laminating a thin layer of foam material to the covering material over substantially the entire area of the latter and by heat-bonding the resultant lamination onto said block, and the longitudinal overhanging portions of the covering material are also heat bonded to the respective edges of the block.

According to a third aspect of the present invention, a blank for producing a covered foam product comprises a block of foam material having a covering material laminated onto a surface thereof, the covering material having a portion which extends beyond an edge of said surface and which has laminated thereon a small thickness of foam material.

DETAILED DESCRIPTION OF THE INVENTION

Figure 1:
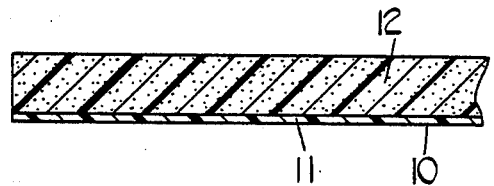
FIGS. 1 to 4 illustrate successive stages in the manufacture of a covered foam product by a first method according to the present invention.

Referring first to FIG. 1, in a first method according to the present invention, a covering material 10 is initially laminated by flame-bonding onto a surface 11 of a block 12 of crosslinked closed cell foam polyethylene. The covering material can be made of ABS, PVC or textile material, for example.

Figure 2:
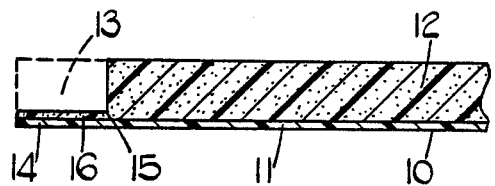

As shown in FIG. 2, a part 13 of the block 12 adjacent one side thereof is then removed so as to create an overhang between a portion 14 of the covering material 10 and a newly created edge 15 of the block, a small thickness 16 of the foam material being left on the portion 14. The part 13 can be removed by routing or by cutting out with a band knife or a hot blade, for example. Most preferably, however, removal of the part 13 is performed by using a hot wire.

Figure 3:
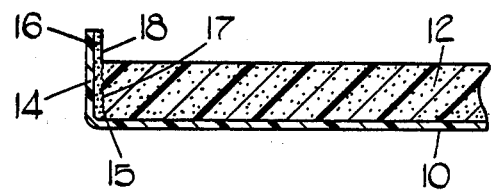

As illustrated in FIG. 3, the portion 14 of the covering material 10 is then folded around the edge 15 of the block 12 to bring the small thickness 16 of the foam material into contact with a side surface 17 of the block. During the folding operation, the small thickness 16 of foam material and/or the block surface 17 are heated, for example by a hot air gun, so that they become welded together when brought into mutual contact.

Figure 4:
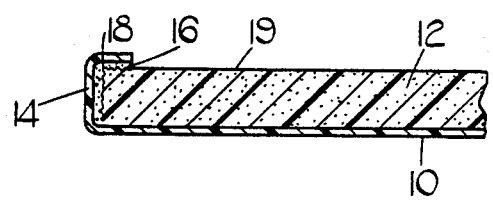

It will be seen that the portion 14 of the covering material 10 is of sufficient dimension that it now extends beyond an edge 18 of the surface 17 opposed to the edge 15. As depicted in FIG. 4, the portion 14 is folded around the edge 18 to bring the small thickness 16 of foam material into contact with a surface 19 of the block, the small thickness 16 of foam material and the surface 19 again being bonded together.

The above-described sequence of operations may then be repeated for other edges of the block 12. Where the completed product is to be used as a mat, a non-slip backing can be applied to the exposed surface 19 of the block. For example, a stabilizing mesh can be bonded to the surface 19, and the nonslip backing can be applied to this mesh in liquid form or alternatively a non-slip coated mesh may be bonded to the surface 19.

It will be manifest that the above method can be applied to various shapes of block 12, depending on the purpose of the finished product. Where, for example a rectangular block is used, parts of the covering material 10 adjacent the corners of the block can be stitched together.

To facilitate mass-production of the covered foam product, the blank illustrated in FIG. 1 can be produced from roll stock in which the covering material 10 is made of the same size and shape as the block 12. The roll can then be cut, folded and bonded in the manner described above. Alternatively, a blank can be produced from roll stock in which the covering material 10 overhangs those edges of the foam block 12 which extend in the direction of production of the roll. After the roll has been cut to the appropriate lengths, edges of the foam block adjacent these cuts are cut out or routed out in the manner illustrated in FIG. 2. In this latter case, the longitudinal overhanging parts of the covering material, i.e., those not provided with a small thickness of foam material thereon, are adhesively bonded to the foam block, whereas the edges of the covering material, where the block has been cut out or routed out, are heat-bonded to the block.

Figure 5:
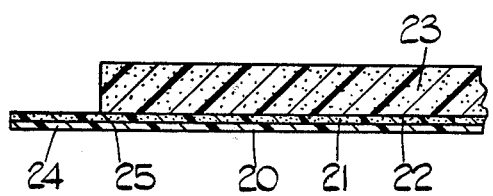
FIG. 5 is a sectional view of part of a blank for use in a second method according to the present invention.

FIG. 5 illustrates an improvement in the last-mentioned method which enables all edges of the covering material to be heat-bonded to the foam block. Initially, a blank is produced in continuous roll form in which a covering material 20 has laminated thereon a small thickness 21 of closed cell foam polyethylene, the whole structure in turn being laminated onto a surface 22 of a block 23 of closed cell foam polyethylene such that the covering material 20 and the layer 21 overhang those edges 25 of the block 23 which extend in the direction of production of the roll, as indicated at 24. In FIG. 5, only one of these edges is shown. The sheet is then cut transversely into appropriate lengths, and those edges of the block 23 which are adjacent the cuts thus made are cut out or routed out in a similar manner to that indicated in FIG. 2, so that a small thickness of foam material remains on the covering material in the regions thus cut. Then the covering material is folded and heat bonded to the block 23 along the four edges thereof.

Covered foam products manufactured as described above are advantageous in that over at least part of its area the covering material is welded to the foam material, rather than merely being adhesive bonded thereto as in the case with existing covered foam products of this type. This makes it more difficult to separate the covering material from the foam material, and hence the covered foam product is more durable.

What is claimed is:

1. A method of manufacturing a covered foam product, comprising the steps of laminating a covering material onto a surface of a block of foam material, producing an overhanging portion of said covering material which extends beyond an edge of said surface and which has laminated thereon a small thickness of foam material, folding said overhanging portion of said covering material over said edge to bring said small thickness of foam material into contact with another surface of said block, and heat-bonding said small thickness of foam material to said other surface of said block.

2. The method according to claim 1, wherein said covering material is laminated directly onto said surface of said block with substantially no overhang with respect to at least one edge of said surface, and wherein said step of producing comprises removing a part of said block adjacent to said at least one edge to leave a small thickness of the foam material on a portion of said covering material, in the region where said part of said block has been removed.

3. The method according to claim 1, wherein said step of producing comprises laminating a small thickness of foam material onto said covering material over substantially the entire area thereof, and heat-bonding said small thickness of foam material to said surface of said block with said covering material extending beyond at least one edge of said block.

4. A method of manufacturing a covered foam product, comprising the steps of producing an elongate blank by laminating a covering material onto a surface of an elongate block of foam material such that respective portions of said covering material overhang longitudinal edges of said elongate block, cutting said elongate blank into individual lengths by means of transverse cuts, removing parts of said block over regions adjacent to said transverse cuts to create portions of said covering material which overhang transverse edges of said block but leaving a small thickness of the foam material on said transverse overhanging portions of said covering material, folding the longitudinal and transverse overhanging portions of said covering material around respective adjacent side surfaces of said block, and bonding said overhanging portions of said covering material to said respective side surfaces of said block, at least said transverse overhanging portions being heat-bonded to said respective side surfaces.

5. The method according to claim 4, wherein said elongate blank is produced by laminating a thin layer of foam material onto said covering material over substantially the entire area of the latter and by heat-bonding said thin layer of foam material onto said block, and said longitudinally overhanging portions of said covering material are heat-bonded to said respective side surfaces of said block.

6. A blank for producing a covered foam product comprising a block of foam material, a covering material laminated onto a surface of said block and having at least one portion which extends beyond an edge of said surface, and a small thickness of foam material laminated onto said at least one portion of said covering material.

7. The blank according to claim 6, wherein said small thickness of foam material is integral with said block.

8. The blank according to claim 6, wherein said small thickness of foam material is formed by a thin layer of foam material which is laminated onto said covering material over substantially the entire area thereof and which is heat-bonded to said block.

9. The blank according to claim 6, wherein said foam material is crosslinked closed cell polyethylene.

* * * * *

UNITED STATES PATENT AND TRADEMARK OFFICE
CERTIFICATE OF CORRECTION

PATENT NO. : 4,385,090
DATED : May 24, 1983
INVENTOR(S) : GEOFFREY SIMS

It is certified that error appears in the above—identified patent and that said Letters Patent is hereby corrected as shown below:

Add to the cover page of the Patent, below "[76]"

--[73] Assignee: Firma Carl Freudenberg, Weinheim/Bergstrasse, Fed. Rep. of Germany--

Signed and Sealed this

Twenty-fifth Day of September 1984

[SEAL]

Attest:

GERALD J. MOSSINGHOFF

Attesting Officer

Commissioner of Patents and Trademarks